United States Patent
Sines

(10) Patent No.: US 10,543,986 B1
(45) Date of Patent: Jan. 28, 2020

(54) ROLLER BELT CONVEYOR

(71) Applicant: INTELLIGRATED HEADQUARTERS, LLC, Mason, OH (US)

(72) Inventor: Vincent Sines, Owings Mills, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/407,713

(22) Filed: May 9, 2019

(51) Int. Cl.
| | | |
|---|---|---|
| *B65G 13/12* | (2006.01) | |
| *B65G 13/02* | (2006.01) | |
| *B65G 39/18* | (2006.01) | |
| *B65G 39/02* | (2006.01) | |
| *B65G 41/00* | (2006.01) | |

(52) U.S. Cl.
CPC ............. *B65G 13/12* (2013.01); *B65G 13/02* (2013.01); *B65G 39/025* (2013.01); *B65G 39/18* (2013.01); *B65G 41/002* (2013.01); *B65G 2207/34* (2013.01); *B65G 2811/09* (2013.01)

(58) Field of Classification Search
CPC ...... B65G 13/02; B65G 39/18; B65G 39/005; B65G 41/002
USPC ........... 193/35 MD; 198/369.4, 370.09, 782, 198/789, 802
See application file for complete search history.

(56) References Cited

U.S. PATENT DOCUMENTS

| | | | | |
|---|---|---|---|---|
| 4,264,005 A | * | 4/1981 | Smock ................... | B65G 13/07 198/781.06 |
| 4,852,721 A | * | 8/1989 | Stille .................... | B65G 39/025 198/782 |
| 5,240,102 A | * | 8/1993 | Lucas ................... | B65G 13/10 198/456 |
| 6,179,113 B1 | * | 1/2001 | Wunscher .............. | B65G 13/10 198/436 |
| 7,249,671 B2 | * | 7/2007 | Riddick ................. | B65G 17/24 198/457.05 |
| 7,506,751 B2 | | 3/2009 | Fourney | |
| 7,971,701 B2 | * | 7/2011 | Fourney ................. | B65G 17/24 198/370.09 |
| 8,052,326 B2 | * | 11/2011 | Pike ....................... | A61G 1/003 193/35 MD |
| 8,960,401 B2 | * | 2/2015 | Parsons ................. | B23K 37/00 193/35 SS |
| 9,079,717 B1 | * | 7/2015 | Costanzo ............... | B65G 17/24 |
| 9,108,801 B2 | * | 8/2015 | Constanzo ............. | B65G 17/24 |
| 9,428,338 B2 | * | 8/2016 | Ragan .................... | B65G 17/24 |
| 9,745,143 B2 | * | 8/2017 | Wilkins ................ | B65G 39/025 |
| 2014/0116841 A1 | | 5/2014 | Wilkins | |
| 2017/0121124 A1 | | 5/2017 | Wilkins | |

* cited by examiner

*Primary Examiner* — Douglas A Hess
(74) *Attorney, Agent, or Firm* — Alston & Bird LLP

(57) ABSTRACT

The present disclosure relates to a roller belt conveyor having an array of pivot rollers defining a conveyance surface that supports an article being conveyed in a first conveying direction, at least one drive plate pivotally coupled to at least a subset of the array of pivot rollers, and an actuator coupled to the at least one drive plate, such that, the actuator may manipulate the at least one drive plate to adjust an angular orientation of the at least one subset of the array of pivot rollers from the first conveying direction to a second conveying direction.

20 Claims, 6 Drawing Sheets

ROLLER BELT CONVEYOR

TECHNOLOGICAL FIELD

Example embodiments of the present invention relate generally to material handling systems, and more particularly, to roller belt conveyors for conveying articles.

BACKGROUND

In a high-volume distribution and fulfillment center, material handling systems, such as conveyors, are generally used to convey, divert, sort, and/or organize articles. For example, a conveyor may accept an unregulated flow of articles and may divert and/or align the articles to discharge the articles in an organized manner for further handling and/or processing. Thus, material handling systems that convey, divert, sort, and/or organize articles are essential to the overall efficiency of a distribution center. Applicant has identified several technical challenges associated with conveyors and other associated systems and methods. Through applied effort, ingenuity, and innovation, many of these identified challenges have been overcome by developing solutions that are included in embodiments of the present invention, many examples of which are described in detail herein.

BRIEF SUMMARY

The illustrative embodiments of the present disclosure relate to systems and methods for diverting articles in a material handling environment. According to at least one aspect of the present disclosure, a roller belt conveyor is provided. The roller belt conveyor may include an array of pivot rollers defining a conveyance surface that supports an article being conveyed in a first conveying direction. The roller belt conveyor may further include at least one drive plate pivotally coupled to at least a subset of the array of pivot rollers, and an actuator coupled to the at least one drive plate, such that the actuator may manipulates the at least one drive plate to adjust an angular orientation of the at least one subset of the array of pivot rollers from the first conveying direction to a second conveying direction.

According to one or more embodiments of the present disclosure, the roller belt conveyor may further include a pivotable connector having a first end pivotally coupled to a pivot roller of the array of pivot rollers and a second end coupled to the at least one drive plate.

According to one or more embodiments of the present disclosure, the actuator may include a cam connector having an elongated slot for receiving an arm of the at least one drive plate, such that the elongated slot may enable a sliding movement of the arm within the slot for manipulating the at least one drive plate. Further, according to one or more embodiments, the actuator may include a motor operatively coupled to the cam connector for driving the cam connector.

According to one or more embodiments of the present disclosure, the array of pivot rollers may include a first subset of pivot rollers coupled to a first drive plate, and a second subset of pivot rollers coupled to a second drive plate, such that the actuator may manipulate at least one of the first drive plate and the second drive plate to adjust an angular orientation of at least one of the first subset of pivot rollers and the second subset of pivot rollers, respectively.

According to one or more embodiments of the present disclosure, the actuator may manipulate the at least one drive plate to pivot the at least one subset of the array of pivot rollers in a first direction to divert one or more articles being conveyed on the roller belt conveyor in the first direction.

According to one or more embodiments of the present disclosure, the actuator may manipulate the at least one drive plate to pivot the at least one subset of the array of pivot rollers in a second direction to divert one or more articles being conveyed on the roller belt conveyor in the second direction.

According to one or more embodiments of the present disclosure, the roller belt conveyor may further include one or more elongated rollers disposed over and in rotatable contact with the array of pivot rollers such that a divert direction of the one or more elongated rollers may be perpendicular to a conveyance direction of the roller belt conveyor. Further, the actuator may pivot the at least one subset of the array of pivot rollers in a first direction to drive the one or more elongated rollers in a first divert direction. The actuator may further pivot the at least one subset of the array of pivot rollers in a second direction to drive the one or more elongated rollers in a second divert direction.

According to another aspect of the present disclosure, a material handling system is provided. The material handling system may include a roller belt conveyor having an array of pivot rollers defining a conveyance surface that supports an article. The roller belt conveyor may further include at least one drive plate pivotally coupled to at least a subset of the array of pivot rollers, and an actuator coupled to the at least one drive plate, such that the actuator may manipulates the at least one drive plate to adjust an angular orientation of the at least one subset of the array of pivot rollers relative to a conveyance direction of the roller belt conveyor. The roller belt conveyor may further include one or more elongated rollers disposed over and in rotatable contact with the array of pivot rollers such that a divert direction of the one or more elongated rollers may be perpendicular to a conveyance direction of the roller belt conveyor. The actuator may adjust the angular orientation of the at least one subset of the array of pivot rollers to drive the one or more elongated rollers in the divert direction.

According to one or more embodiments of the present disclosure, the roller belt conveyor may further include a pivotable connector having a first end pivotally coupled to a pivot roller of the array of pivot rollers and a second end coupled to the at least one drive plate.

According to one or more embodiments of the present disclosure, the actuator may include a cam connector having an elongated slot for receiving an arm of the at least one drive plate, such that the elongated slot may enable a sliding movement of the arm within the slot for manipulating the at least one drive plate. Further, the actuator may include a motor operatively coupled to the cam connector for driving the cam connector.

According to one or more embodiments of the present disclosure, the array of pivot rollers may include a first subset of pivot rollers coupled to a first drive plate, and a second subset of pivot rollers coupled to a second drive plate, such that the actuator may manipulate at least one of the first drive plate and the second drive plate to adjust an angular orientation of at least one of the first subset of pivot rollers and the second subset of pivot rollers, respectively.

According to one or more embodiments of the present disclosure, the actuator may manipulate the at least one drive plate to pivot the at least one subset of the array of pivot rollers in a first direction to divert one or more articles being conveyed on the roller belt conveyor in the first direction.

According to one or more embodiments of the present disclosure, the actuator may manipulate the at least one drive plate to pivot the at least one subset of the array of pivot rollers in a second direction to divert one or more articles being conveyed on the roller belt conveyor in the second direction.

According to one or more embodiments of the present disclosure, the actuator may pivot the at least one subset of the array of pivot rollers in a first direction to drive the one or more elongated rollers in a first divert direction.

According to one or more embodiments of the present disclosure, the actuator may pivot the at least one subset of the array of pivot rollers in a second direction to drive the one or more elongated rollers in a second divert direction.

According to another aspect of the present disclosure, a roller belt conveyor is provided. The roller belt conveyor may include a mounting plate having a plurality of openings for receiving a plurality of pivot rollers forming an array of pivot rollers. The array of pivot rollers may define a conveyance surface that supports an article being conveyed in a first conveying direction. The roller belt conveyor may further include at least one drive plate pivotally coupled to at least a subset of the array of pivot rollers through one or more pivotable connectors, such that each of the one or more pivotable connectors may include a first end pivotally coupled to a pivot roller of the array of pivot rollers and a second end coupled to the at least one drive plate. The roller belt conveyor may further include an actuator including a cam connector having an elongated slot for receiving an arm of the at least one drive plate, such that the elongated slot may enable a sliding movement of the arm within the slot for manipulating the at least one drive plate to adjust an angular orientation of the at least one subset of the array of pivot rollers from the first conveying direction to a second conveying direction.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denoting like components throughout the several views. However, it will be apparent to those skilled in the art of the present disclosure that these concepts may be practiced without these specific details.

Example distribution and order fulfillment centers may include material handling systems for conveying, diverting, sorting, and/or organizing articles. In some examples, the material handling systems may include conveyors that may receive an unregulated flow of articles and may divert and/or align articles into an organized stream of articles for further handling and/or processing. In some examples, the material handling system may include a roller belt conveyor having a conveyor belt including a plurality of pivotable rollers that may be controlled for selectively diverting articles to align, sort, singulate, and/or otherwise organize a stream of articles. In some examples, roller belt conveyors include a gear-based driving mechanism for driving the pivotable rollers, which is expensive, complex, and prone to frequent failures.

One or more example embodiments of the present disclosure described herein include a simpler, cost-effective, and low-maintenance means for driving the pivotable rollers. The roller belt conveyor described herein, in some examples, includes a drive plate coupled to a subset of pivotable rollers, such that an angular orientation of the subset of pivotable rollers may be adjusted by manipulating the drive plate.

Figure 1:
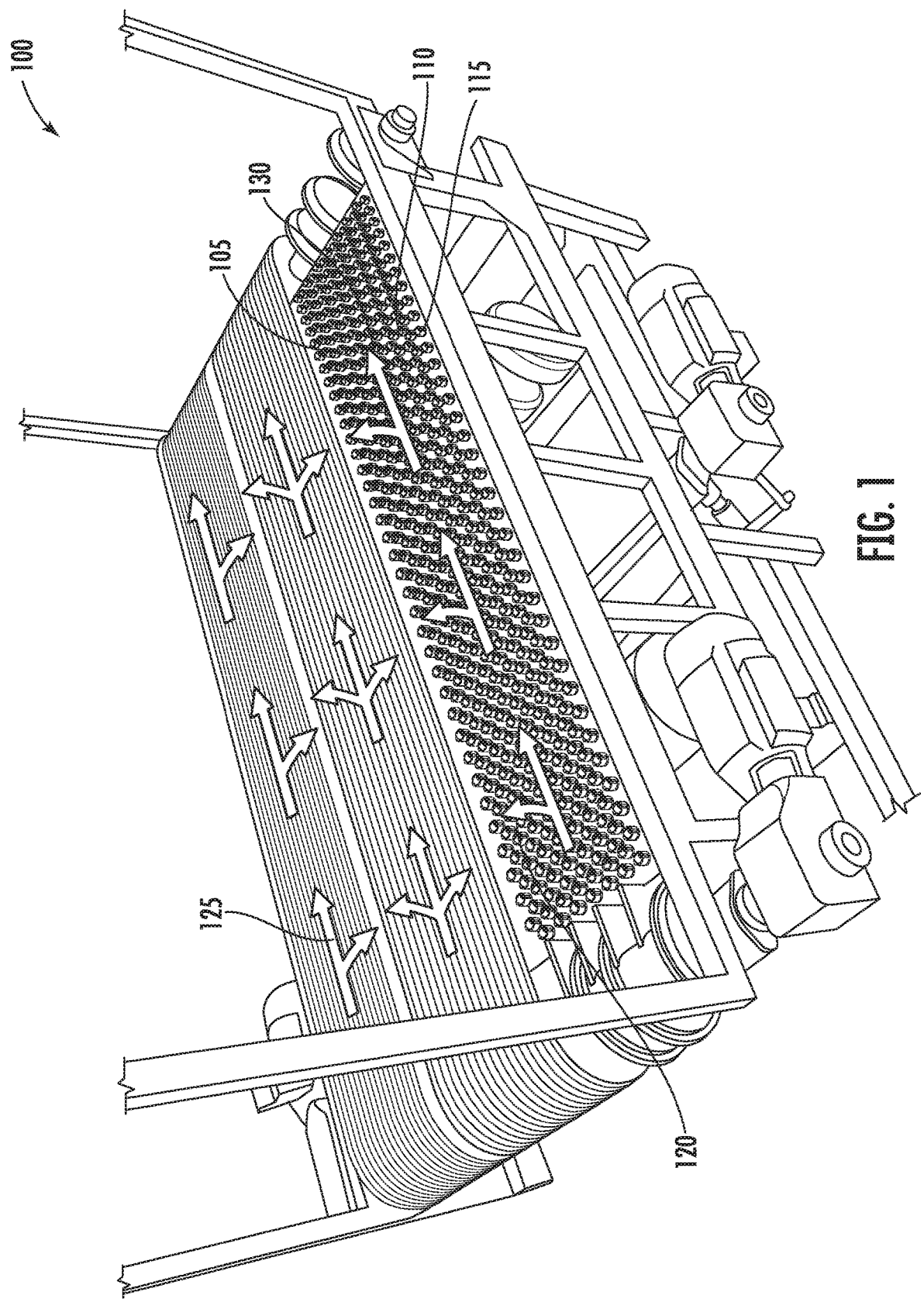
FIG. 1 illustrates a perspective view of a material handling system in accordance with an example embodiment of the present disclosure.

FIG. 1 illustrates a perspective view of a material handling system 100, in accordance with one or more embodiments of the present disclosure. As shown in FIG. 1, the material handling system 100 may include a roller belt conveyor 105. The roller belt conveyor 105 may include an array of pivot rollers 115. In an example embodiment, the pivot rollers 115 may be mounted on a mounting plate. In an embodiment, the mounting plate may refer to a conveyor belt 110. As shown in FIG. 1, the pivot rollers 115 may be mounted on the conveyor belt 110 such that at least a portion of the pivot rollers 115 may extend above the conveyor belt 110. The pivot rollers 115 mounted on the conveyor belt 110 may further travel with the conveyor belt 110 in a direction of conveyance of the conveyor belt 110.

Further, the pivot rollers 115 may be pivotable in one or more angular orientations for selectively diverting one or more articles on the roller belt conveyor 105. In an example embodiment, the pivot rollers 115 may be pivotable in a first direction 120 and/or a second direction 125. Thus, an angular orientation of one or more pivot rollers 115 may be adjusted to divert an article in at least the first direction 120 and/or the second direction 125 while conveying the article forward in a conveyance direction 130 (e.g., the direction of travel of the conveyor belt 110) of the roller belt conveyor 105).

Figure 2:
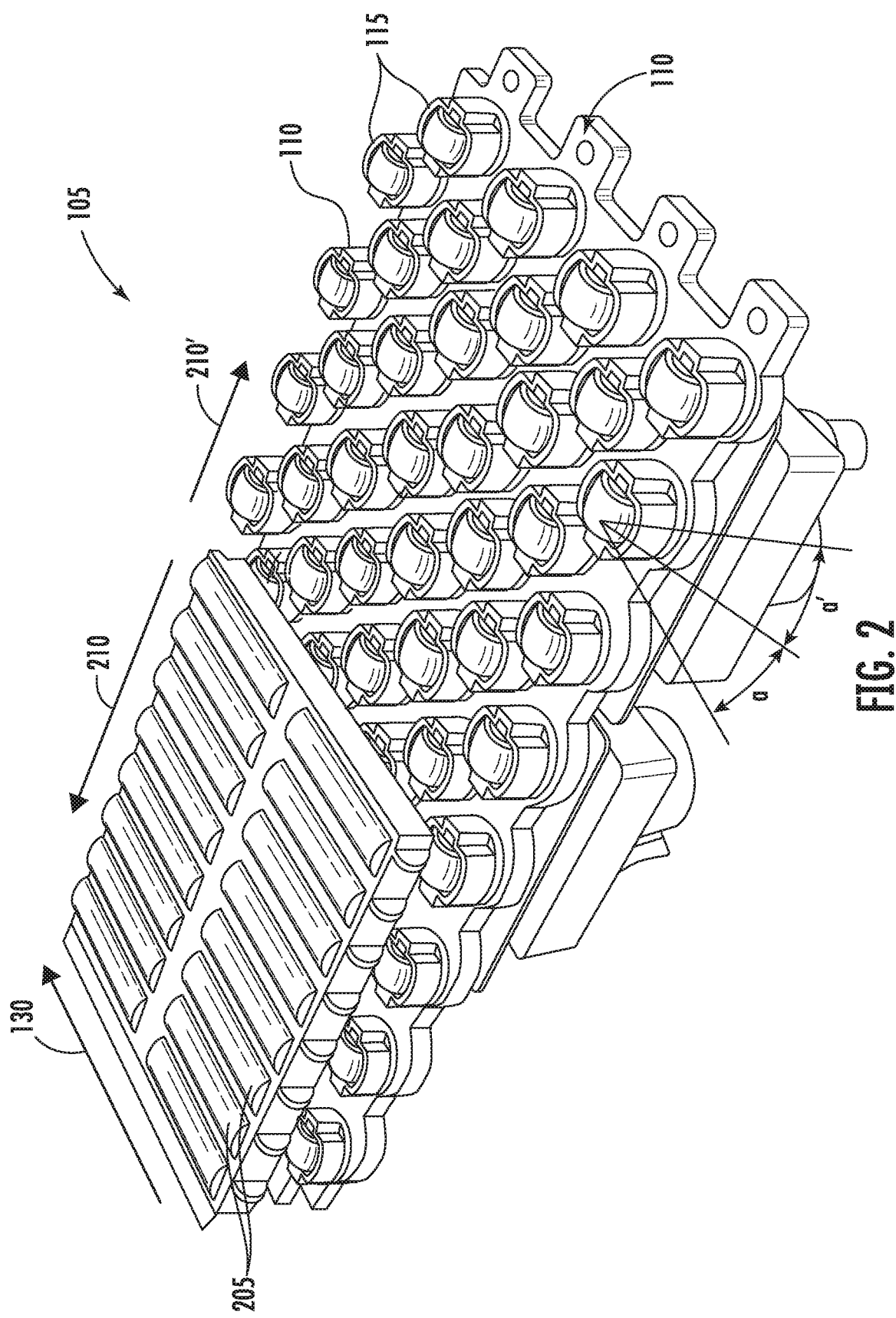
FIG. 2 illustrates a perspective view of a roller belt conveyor, in accordance with one or more example embodiments of the present disclosure.

FIG. 2 illustrates a perspective view of roller belt conveyor 105, in accordance with one or more example embodiments of the present disclosure. As shown in FIG. 2, the roller belt conveyor 105 may include an array of pivot rollers 115 mounted on the conveyor belt 110. Further, in an example embodiment, the roller belt conveyor 105 may include one or more elongated rollers 205 disposed over the array of pivot rollers 115, as shown in FIG. 2. The elongated rollers 205 may be in rotatable contact with the array of pivot rollers 115 such that the elongated rollers 205 may be rotatable with a change in angular orientation of the pivot rollers 115. That is, in a default position, the pivot rollers 115 may be oriented in the conveyance direction 130 of the roller belt conveyor 105, as shown in FIG. 2. Thus, an angular orientation of the array of the pivot rollers 115 may be selectively controlled to drive the elongated rollers 205 in the first divert direction 210 and/or the second divert direction 210' for diverting one or more articles.

Elongated rollers 205 may be disposed such that a first divert direction 210 and a second divert direction 210' of the elongated rollers 205 may be perpendicular to the conveyance direction 130 of the roller belt conveyor 105, as shown in FIG. 2. In some examples, an angular orientation of the one or more of the pivot rollers 115 may be adjusted to drive one or more elongated rollers 205. In some examples, the one or more elongated rollers 205 may be rotated in the first divert direction 210 and/or the second divert direction 210' based on the angular orientation of the one or more pivot rollers 115. For example, a pivot roller 115 may be reoriented by a first swivel angle a relative to the conveyance direction 130, as shown in FIG. 2. In response, the one or more elongated rollers 205 that are in rotatable contact with the pivot roller 115 are be rotated in the second divert direction 210'. Similarly, and in some examples, the pivot roller 115 may be reoriented by a second swivel angle a' relative to the conveyance direction 130, as shown in FIG. 2. In response, the one or more elongated rollers 205 that are in rotatable contact with the pivot roller 115 are rotated in the first divert direction 210.

Figure 3A:
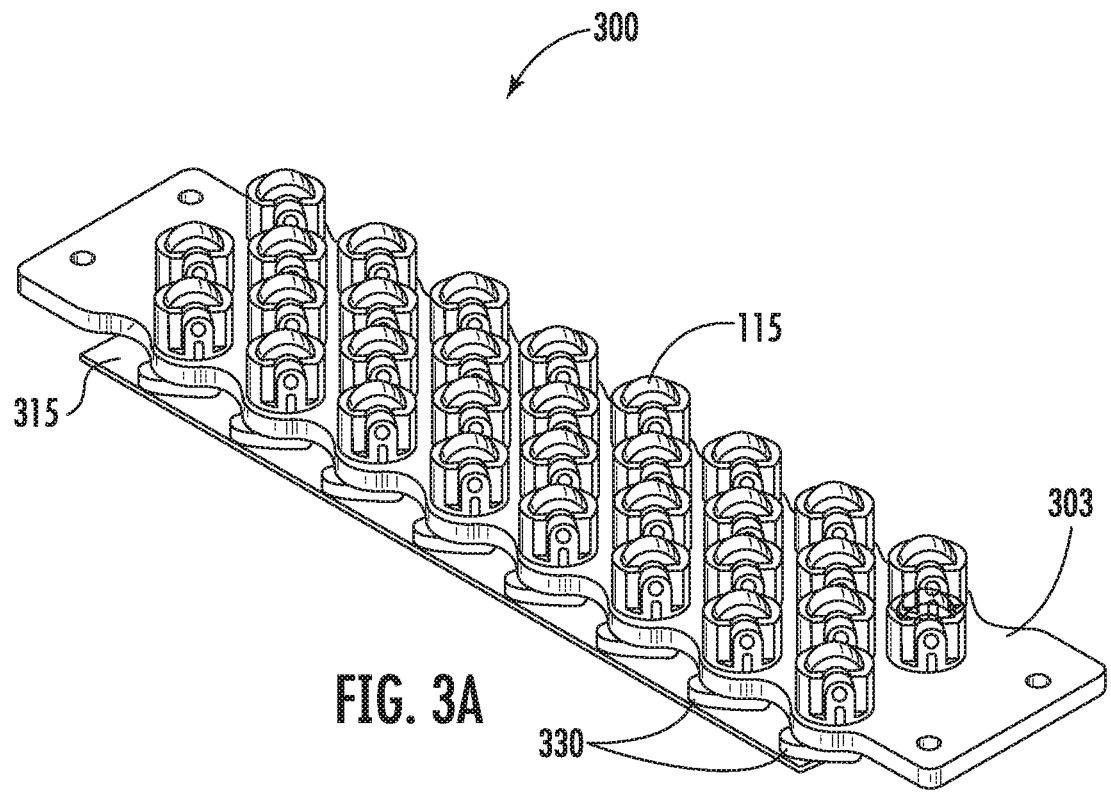
FIG. 3A illustrates a perspective view of the roller belt conveyor, in accordance with an example embodiment of the present disclosure.
Figure 3B:
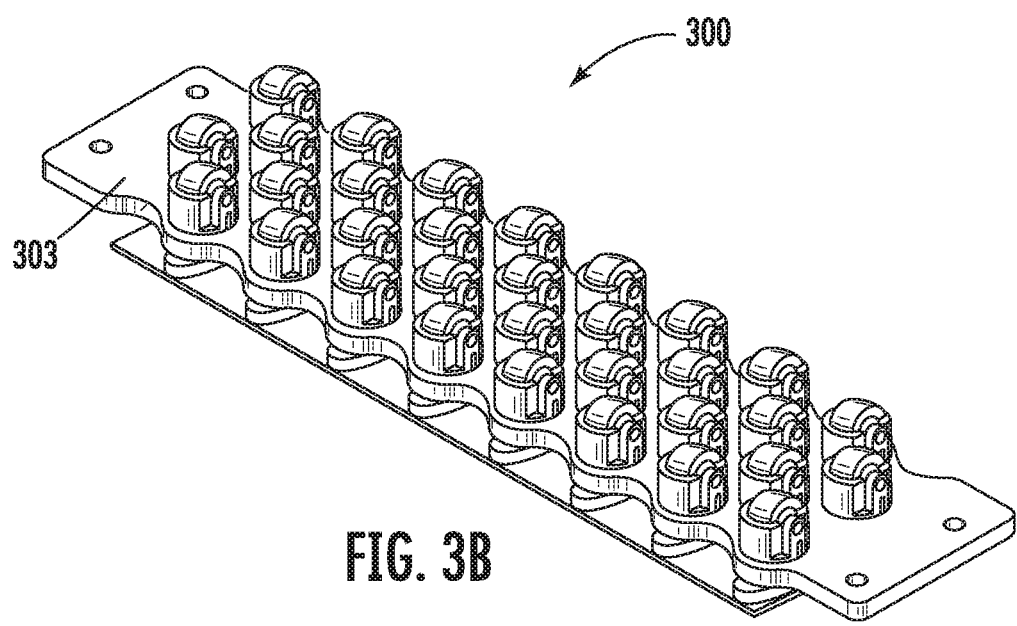
FIG. 3B illustrates a perspective view of the roller belt conveyor, in accordance with another example embodiment of the present disclosure.

FIG. 3A illustrates a perspective view of a subset 300 of the array of pivot rollers 115 of the roller belt conveyor 105 in a first angular orientation, in accordance with one or more example embodiments of the present disclosure. Similarly, FIG. 3B illustrates a perspective view of the subset 300 of the array of pivot rollers 115 in a second angular orientation, in accordance with one or more example embodiments of the present disclosure. As shown in FIGS. 3A and 3B, the subset 300 of the array of pivot rollers 115 may include pivot rollers 115 mounted on a conveyor belt 303. Further, the subset 300 of the array of pivot rollers 115 may be coupled to a drive plate 315, as shown in FIG. 3A-3B.

In an example embodiment, each pivot roller 115 may be coupled to the drive plate 115 through a pivotable connector 330, as shown in FIG. 3A-3B. The drive plate 315 may include one or more openings (not shown) for receiving the pivotable connector 330. FIG. 3A depicts the drive plate 315 in a first position causing the pivotable connectors 330 and the pivot rollers 115 to be oriented in a first angular orientation, and FIG. 3B depicts the drive plate 315 manipulated to a second position causing the pivotable connectors 330 and the pivot rollers 115 to be oriented in a second angular orientation, as shown. Thus, an angular orientation of the subset 300 of the array of pivot rollers 115 may be adjusted and/or controlled by manipulating the drive plate 315.

Figure 4:
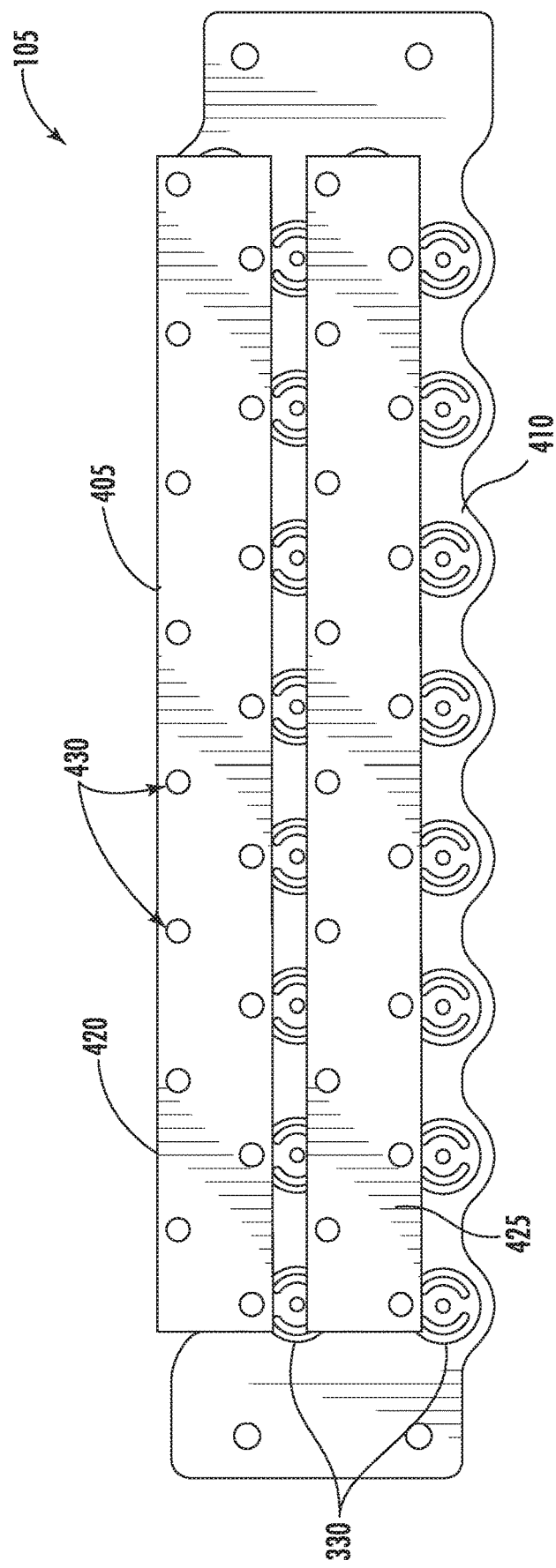
FIG. 4 illustrates a bottom view of the roller belt conveyor, in accordance with one or more example embodiments of the present disclosure.

FIG. 4 illustrates a bottom view of a section of the roller belt conveyor 105, in accordance with one or more example embodiments of the present disclosure. As shown in FIG. 4, the roller belt conveyor 105 may include a first subset 405 of the array of pivot rollers coupled to a first drive plate 420 through pivotable connectors 330. The roller conveyor 105 may further include a second subset 410 of the array of pivot rollers coupled to a second drive plate 425 through pivotable connectors 330. As shown in FIG. 4, the first drive plate 420 and the second drive plate 425 may include one or more openings 430 to receive a connecting member of pivotable connectors 330. In an example embodiment, each pivotable connector 330 may be non-rotatably coupled to the first drive plate 420 and/or the second drive plate 425. In an example embodiment, the first drive plate 420 and the second drive plate 425 may be manipulated together or individually to control the angular orientation of the first subset 405 and the second subset 410 of the array of pivot rollers, respectively.

Figure 5:
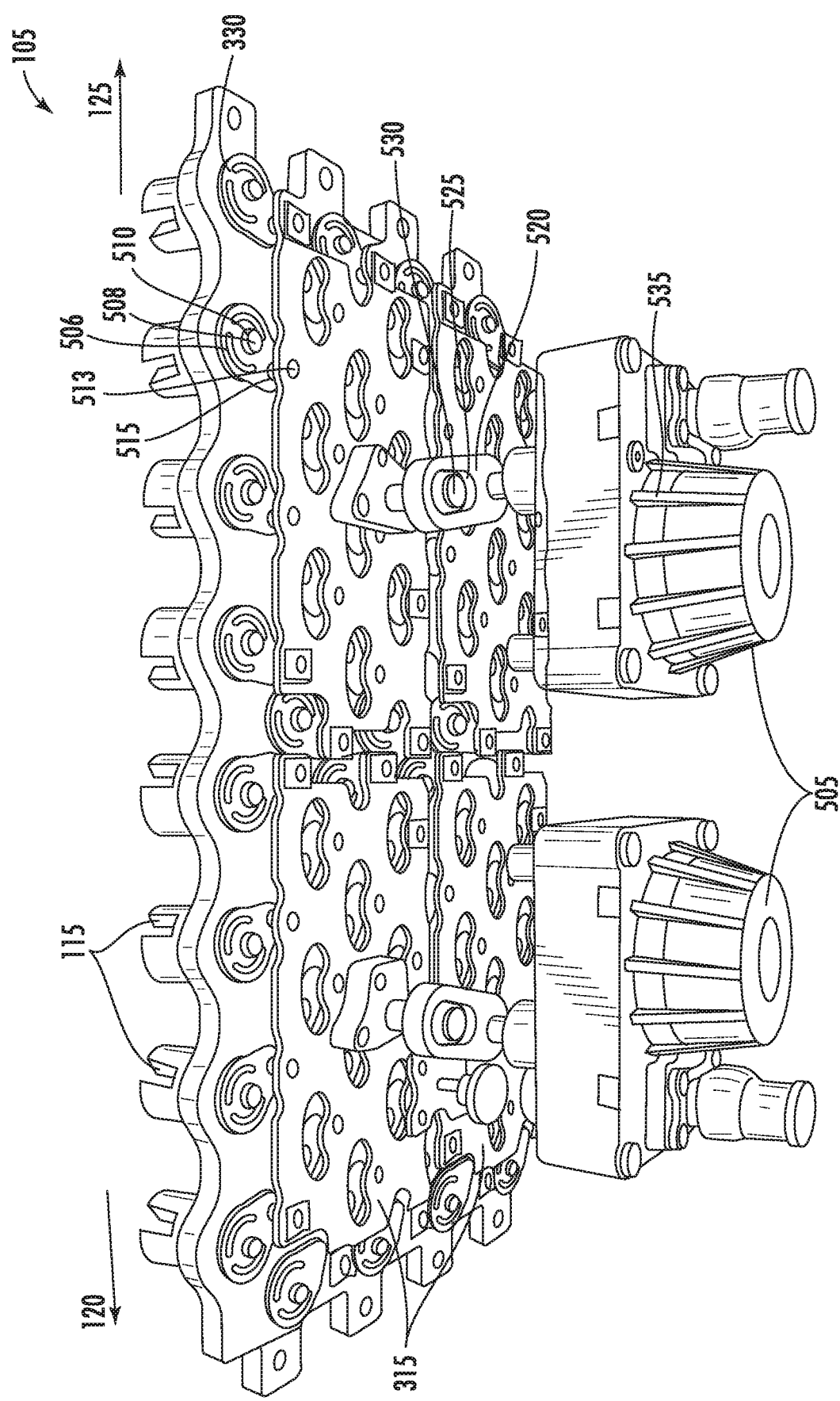
FIG. 5 illustrates another bottom view of the roller belt conveyor, in accordance with one or more example embodiments of the present disclosure.

FIG. 5 illustrates a bottom view of roller belt conveyor 105, in accordance with one or more example embodiments of the present disclosure. As shown in FIG. 5, the roller belt conveyor 105 includes an array of pivot rollers 115, such that each subset of the array of pivot rollers 115 may be coupled to a drive plate 315. As described above, each pivot roller 115 may be coupled to the drive plate 315 through pivotable connector 330.

In an example embodiment, the pivotable connector 330 may include a first end 510 having an opening to receive a roller connecting member 508, such as, but not limited to, a screw, a pin, a bolt, and the like, for rotatably coupling the pivotable connector 330 to the pivot roller 115. Further, the pivotable connector 330 may include a second end 515 having an opening to receive a drive plate connecting member 513, such as, but not limited to, a screw, a pin, a bolt, and the like, for fixedly coupling the pivotable connector 330 to the drive plate 315. In an example embodiment, the pivotable connector 330 may further include one or more grooves 506, as shown in FIG. 5, for receiving at least a portion of a body of the pivot roller 115, such that, as the pivotable connector 330 is rotated, the pivot roller 115 may also be rotated along with the pivotable connector 330. Thus, in the example embodiment, the drive plate 315 may be manipulated, such that the pivotable connector 330 fixedly coupled to the drive plate 315 at the second end 515 may pivot about the roller connecting member 508 at the first end 510, thereby, rotating, through the one or more grooves 506, the pivot roller 115 coupled to the pivotable connector 330.

Further, in an example embodiment, the roller belt conveyor 105 may include one or more actuators 505, as shown in FIG. 5. The actuators 505 may be operatively coupled to at least one drive plate 315 for manipulating the drive plate 315 to adjust an angular orientation of the pivot rollers 115 coupled to the drive plate 315.

In an example embodiment, the actuator 505 may include a cam connector 520 and a motor 535 operatively coupled to the cam connector 520. The cam connector 520 may pivotally couple the actuator 505 to the drive plate 315, as shown in FIG. 5. In an example embodiment, the cam connector 520 may include an elongated slot 525 for receiving an arm 530 of and/or coupled to the drive plate 315, as shown in FIG. 5. The elongated slot 525 may enable the arm 530 to slidably move within the elongated slot 525 for manipulating the drive plate 315.

Specifically, and in some example embodiments, the cam connector 520 may be rotatably driven by the motor 535 of the actuator 505, such that, the cam connector 520 may reciprocate between one or more fixed positions thereby linearly manipulating the drive plate 315 through the sliding motion of the arm 530 within the elongated slot 525 of the cam connector 520. The rotary motion of the cam connector 520 may be converted into a linear motion of the drive plate 315 for adjusting the angular orientation of the pivot rollers 115 coupled to the drive plate 315. Specifically, the linear motion of the drive plate 315 results in the pivotable connector 330, fixedly coupled to the drive plate 315 at the second end 515, pivoting about the roller connecting member 508 at the first end 510, thereby, rotating the pivot roller 115 coupled to the pivotable connector 330 through the one or more grooves 506. Hence, an angular orientation of the array of pivot roller 115 coupled to the drive plate 315 may be adjusted.

Thus, in an example embodiment, the actuator 520 may manipulate the drive plate 315 to pivot a subset of the array of pivot rollers 115 in the first direction 120 and/or the second direction 125 to divert one or more articles for aligning, sorting, singulating, and/or organizing the one or more articles.

Figure 6:
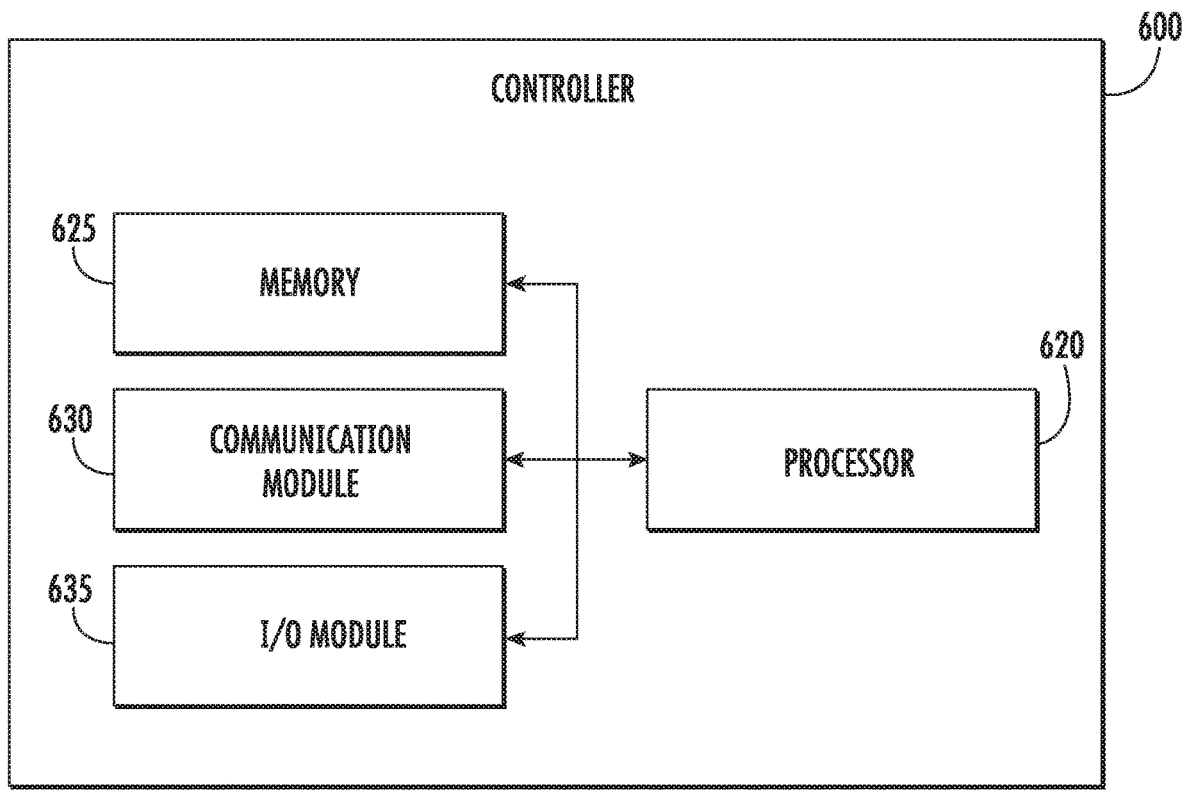
FIG. 6 illustrates a schematic block diagram of a controller of the material handling system, in accordance with one or more embodiments of the present disclosure.

FIG. 6 illustrates a schematic block diagram of a controller 600 for controlling the operation of the material handling system 100, the roller belt conveyor 105, and/or the actuator 505, in accordance with one or more embodiments of the present disclosure. As shown, the controller 600 may include at least one processor 620, memory 625, communication module 630, and input/output module 635. The processor 620 may be configured with processor executable instructions to perform operations described herein. Processor 620 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 6 as a single processor, in some embodiments processor 620 may comprise a plurality of processors. The plurality of processors may be embodied on a single device or may be distributed across a plurality of devices. The plurality of processors may be in operative communication with each other and may be collectively configured to perform one or more functionalities of the controller 600 as described herein. In an example embodiment, processor 620 is configured to execute instructions stored in memory 625 or otherwise accessible to processor 620. These instructions, when executed by processor 620, may cause controller 600 to perform one or more of the functionalities of controller 600.

In an exemplary embodiment, the processor 620 may cause the controller 600 to receive an indication, from one or more sensors, such as, photoeyes, proximity sensors, encoders, and the like, of a presence of an article on the roller belt conveyor 105. The processor 620 may further receive an indication, from a user, the material handling system 100, and/or a remote device or server, to divert the article from a first conveyance direction to a second conveyance direction. In response, the processor 620 may actuate the actuator 505 coupled to a drive plate 315 for manipulating the drive plate 315 in a direction corresponding to the second conveyance direction, as described above. Thus, an angular orientation of at least one subset of the array of pivot rollers coupled to the drive plate 315 may be adjusted from the first conveyance direction to the second conveyance direction.

Memory 625 may comprise, for example, volatile memory, non-volatile memory, or some combination thereof. Although illustrated in FIG. 6 as a single memory, memory 625 may comprise a plurality of memory components. The plurality of memory components may be embodied on a single device or distributed across a plurality of devices. In various embodiments, memory 625 may comprise, for example, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. Memory 625 may be configured to store information, data (including item data and/or profile data), applications, instructions, or the like for enabling controller 600 to carry out various functions in accordance with example embodiments of the present invention. For example, in at least some embodiments, memory 625 may buffer input data for processing by processor 620. Additionally or alternatively, in at least some embodiments, memory 625 may store program instructions for execution by processor 620. Memory 625 may store information in the form of static and/or dynamic information. This stored information may be stored and/or used by the controller 600 during the course of performing its functionalities.

Communications module 630 may be embodied as any device or means embodied in circuitry, hardware, a computer program product comprising computer readable program instructions stored on a computer readable medium (e.g., memory 625) and executed by a processing device (e.g., processor 620), or a combination thereof that is configured to receive and/or transmit data from/to another device and/or network, such as, for example, sensors, roller belt conveyor 105, actuator 505, and the like. In some embodiments, communications module 630 (like other components discussed herein) may be at least partially embodied as or otherwise controlled by processor 620. In this regard, communications module 630 may be in communication with processor 620, such as via a bus. Communications module 630 may include, for example, an antenna, a transmitter, a receiver, a transceiver, network interface card and/or supporting hardware and/or firmware/software for enabling communications with another device. Communications module 630 may be configured to receive and/or transmit any data that may be stored by memory 625 using any protocol that may be used for communications between devices. Communications module 630 may additionally or alternatively be in communication with the memory 625, input/output module 635 and/or any other component of the controller 600, such as via a bus.

Input/output module 635 may be in communication with processor 620 to receive an indication of a user input and/or to provide an audible, visual, mechanical, or other output to a user. As such, input/output module 635 may include support, for example, for a keyboard, a mouse, a joystick, a display, a touch screen display, a microphone, a speaker, a RFID reader, barcode reader, biometric scanner, and/or other input/output mechanisms. In embodiments wherein the controller 600 is embodied as a server or database, aspects of input/output module 635 may be reduced as compared to embodiments where the controller 600 is implemented as an end-user machine (e.g., remote worker device and/or employee device) or other type of device designed for complex user interactions. In some embodiments (like other components discussed herein), input/output module 635 may even be eliminated from the controller 600. Alternatively, such as in embodiments wherein the controller 600 is embodied as a server or database, at least some aspects of input/output module 635 may be embodied on an apparatus used by a user that is in communication with the controller 600. Input/output module 635 may be in communication with the memory 625, communications module 630, and/or any other component(s), such as via a bus. One or more than one input/output module and/or other component can be included in the controller 600.

As described above and as will be appreciated based on this disclosure, embodiments of the present invention may be configured as methods, conveyors, material handling systems, warehouse management servers, personal computers, servers, mobile devices, backend network devices, and the like. Accordingly, embodiments may comprise various means formed entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

These computer program instructions may also be stored in a computer-readable storage device (e.g., memory 625) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

It must be noted that, as used in this specification and the appended claims, the singular forms "a," "an," and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A roller belt conveyor, comprising:
    an array of pivot rollers defining a conveyance surface that supports an article being conveyed in a first conveying direction;
    at least one drive plate pivotally coupled to at least a subset of the array of pivot rollers; and
    an actuator coupled to the at least one drive plate, wherein the actuator manipulates the at least one drive plate to adjust an angular orientation of the at least one subset of the array of pivot rollers from the first conveying direction to a second conveying direction.

2. The roller belt conveyor of claim 1, further comprising a pivotable connector having a first end pivotally coupled to a pivot roller of the array of pivot rollers and a second end coupled to the at least one drive plate.

3. The roller belt conveyor of claim 1, wherein the actuator comprises a cam connector having an elongated slot for receiving an arm of the at least one drive plate, wherein the elongated slot enables a sliding movement of the arm within the slot for manipulating the at least one drive plate.

4. The roller belt conveyor of claim 3, wherein the actuator comprises a motor operatively coupled to the cam connector for driving the cam connector.

5. The roller belt conveyor of claim 1, wherein the array of pivot rollers comprises:
a first subset of pivot rollers coupled to a first drive plate; and
a second subset of pivot rollers coupled to a second drive plate,
wherein the actuator manipulates at least one of the first drive plate and the second drive plate to adjust an angular orientation of at least one of the first subset of pivot rollers and the second subset of pivot rollers, respectively.

6. The roller belt conveyor of claim 1, wherein the actuator manipulates the at least one drive plate to pivot the at least one subset of the array of pivot rollers in a first direction.

7. The roller belt conveyor of claim 1, wherein the actuator manipulates the at least one drive plate to pivot the at least one subset of the array of pivot rollers in a second direction.

8. The roller belt conveyor of claim 1, further comprising one or more elongated rollers disposed over and in rotatable contact with the array of pivot rollers such that a divert direction of the one or more elongated rollers is perpendicular to a conveyance direction of the roller belt conveyor.

9. The roller belt conveyor of claim 8, wherein the actuator pivots the at least one subset of the array of pivot rollers in a first direction to drive the one or more elongated rollers in a first divert direction.

10. The roller belt conveyor of claim 8, wherein the actuator pivots the at least one subset of the array of pivot rollers in a second direction to drive the one or more elongated rollers in a second divert direction.

11. A material handling system, comprising:
a roller belt conveyor comprising:
an array of pivot rollers;
at least one drive plate pivotally coupled to at least a subset of the array of pivot rollers; and
an actuator coupled to the at least one drive plate, wherein the actuator manipulates the at least one drive plate to adjust an angular orientation of the at least one subset of the array of pivot rollers relative to a conveyance direction of the roller belt conveyor;
one or more elongated rollers disposed over and in rotatable contact with the array of pivot rollers such that a divert direction of the one or more elongated rollers is perpendicular to a conveyance direction of the roller belt conveyor, wherein adjusting the angular orientation of the at least one subset of the array of pivot rollers drives the one or more elongated rollers in the divert direction.

12. The material handling system of claim 11, wherein the roller belt conveyor further comprises a pivotable connector having a first end pivotally coupled to a pivot roller of the array of pivot rollers and a second end coupled to the at least one drive plate.

13. The material handling system of claim 11, wherein the actuator comprises a cam connector having an elongated slot for receiving an arm of the at least one drive plate, wherein the elongated slot enables a sliding movement of the arm within the slot for manipulating the at least one drive plate.

14. The material handling system of claim 13, wherein the actuator comprises a motor operatively coupled to the cam connector for driving the cam connector.

15. The material handling system of claim 11, wherein the array of pivot rollers comprises:
a first subset of pivot rollers coupled to a first drive plate; and
a second subset of pivot rollers coupled to a second drive plate,
wherein the actuator manipulates at least one of the first drive plate and the second drive plate to adjust an angular orientation of at least one of the first subset of pivot rollers and the second subset of pivot rollers, respectively.

16. The material handling system of claim 11, wherein the actuator manipulates the at least one drive plate to pivot the at least one subset of the array of pivot rollers in a first direction to divert one or more articles being conveyed on the roller belt conveyor in the first direction.

17. The material handling system of claim 11, wherein the actuator manipulates the at least one drive plate to pivot the at least one subset of the array of pivot rollers in a second direction to divert one or more articles being conveyed on the roller belt conveyor in the second direction.

18. The material handling system of claim 11, wherein the actuator pivots the at least one subset of the array of pivot rollers in a first direction to drive the one or more elongated rollers in a first divert direction.

19. The material handling system of claim 11, wherein the actuator pivots the at least one subset of the array of pivot rollers in a second direction to drive the one or more elongated rollers in a second divert direction.

20. A roller belt conveyor, comprising:
a mounting plate having a plurality of openings for receiving a plurality of pivot rollers forming an array of pivot rollers, wherein the array of pivot rollers defines a conveyance surface that supports an article being conveyed in a first conveying direction;
at least one drive plate pivotally coupled to at least a subset of the array of pivot rollers through one or more pivotable connectors, wherein each of the one or more pivotable connectors includes a first end pivotally coupled to a pivot roller of the array of pivot rollers and a second end coupled to the at least one drive plate; and
an actuator comprising a cam connector having an elongated slot for receiving an arm of the at least one drive plate, wherein the elongated slot enables a sliding movement of the arm within the slot for manipulating the at least one drive plate to adjust an angular orientation of the at least one subset of the array of pivot rollers from the first conveying direction to a second conveying direction.

\* \* \* \* \*